United States Patent
Kuehne

(10) Patent No.: US 12,204,099 B2
(45) Date of Patent: Jan. 21, 2025

(54) METHOD AND CONTROL DEVICE FOR OPERATING A HEAD-MOUNTED DISPLAY DEVICE IN A MOTOR VEHICLE

(71) Applicant: AUDI AG, Ingolstadt (DE)

(72) Inventor: Marcus Kuehne, Beilngries (DE)

(73) Assignee: AUDI AG, Ingolstadt (DE)

( * ) Notice: Subject to any disclaimer, the term of this patent is extended or adjusted under 35 U.S.C. 154(b) by 550 days.

(21) Appl. No.: 17/279,249

(22) PCT Filed: May 21, 2019

(86) PCT No.: PCT/EP2019/063019
§ 371 (c)(1),
(2) Date: Mar. 24, 2021

(87) PCT Pub. No.: WO2020/064152
PCT Pub. Date: Apr. 2, 2020

(65) Prior Publication Data
US 2022/0003995 A1    Jan. 6, 2022

(30) Foreign Application Priority Data

Sep. 25, 2018   (DE) ............... 10 2018 216 383.9

(51) Int. Cl.
*G02B 27/01* (2006.01)
*B60K 35/00* (2024.01)
(Continued)

(52) U.S. Cl.
CPC ............. *G02B 27/01* (2013.01); *B60K 35/00* (2013.01); *B60K 35/22* (2024.01); *B60K 35/28* (2024.01);
(Continued)

(58) Field of Classification Search
CPC ....... G06F 3/011; G06T 19/006; G06T 15/20; A63F 13/803
See application file for complete search history.

(56) References Cited

U.S. PATENT DOCUMENTS 9,459,692 B1    10/2016  Li
10,969,748 B1 *  4/2021  Goslin ............... G08B 7/06
(Continued)

FOREIGN PATENT DOCUMENTS

DE   20 2012 009 352 U1   1/2013
DE   10 2013 016 242 A1   4/2015
(Continued)

OTHER PUBLICATIONS

Coaster101.com ("The Great Lego Race VR Coaster at Legoland Florida POV and Full Animation" https://www.youtube.com/watch?v =-2_TMSyl0GQ Mar. 24, 2018.) (Year: 2018).*
(Continued)

*Primary Examiner* — Jaime Figueroa
*Assistant Examiner* — Jerrod Irvin Davis
(74) *Attorney, Agent, or Firm* — STAAS & HALSEY LLP

(57) ABSTRACT

A display device that can be worn on the head of a vehicle occupant of a motor vehicle is controlled to display a virtual environment within which the vehicle occupant wearing the display device virtually moves according to a detected movement of the motor vehicle. A potential stopping point of the motor vehicle is determined. A deceleration of the motor vehicle is detected within a given environment of the potential stopping point and the display device is controlled to output a virtual scene staging within the virtual environment which causes a deceleration of the virtual movement of the vehicle occupant within the virtual environment corresponding to the deceleration of the motor vehicle.

20 Claims, 2 Drawing Sheets

(51) Int. Cl.
   *B60K 35/22*   (2024.01)
   *B60K 35/28*   (2024.01)

(52) U.S. Cl.
   CPC .... *B60K 2360/16* (2024.01); *G02B 2027/014* (2013.01); *G02B 2027/0141* (2013.01)

(56) References Cited

U.S. PATENT DOCUMENTS

| | | | |
|---|---|---|---|
| 2015/0062125 | A1 | 3/2015 | Aguilera Perez et al. |
| 2015/0097864 | A1 | 4/2015 | Alaniz et al. |
| 2017/0132017 | A1* | 5/2017 | Kuehne .................. G06F 3/013 |
| 2018/0089901 | A1 | 3/2018 | Rober et al. |
| 2018/0211414 | A1* | 7/2018 | Cronin ................. B60W 40/02 |
| 2018/0357836 | A1* | 12/2018 | Ishiguro ................. G06F 3/012 |
| 2019/0019329 | A1* | 1/2019 | Eyler .................... G06T 19/006 |

FOREIGN PATENT DOCUMENTS

| | | | |
|---|---|---|---|
| DE | 10 2014 220 001 A1 | 4/2015 | |
| DE | 10 2014 220 053 A1 | 7/2015 | |
| DE | 10 2014 019 579 A1 | 6/2016 | |
| DE | 10 2015 003 882 A1 | 9/2016 | |
| DE | 10 2016 120 427 A1 | 4/2017 | |
| DE | 10 2017 005 982 A1 | 2/2018 | |
| DE | 10 2018 216 383.9 | 9/2018 | |
| EP | 2 944 532 A2 | 11/2015 | |
| JP | 2008-094377 | 4/2008 | |
| JP | 2018076027 A * | 5/2018 | |
| WO | 2016197068 A1 | 12/2016 | |
| WO | WO-2018057980 A1 * | 3/2018 | ............. B60K 35/00 |
| WO | PCT/EP2019/063019 | 5/2019 | |

OTHER PUBLICATIONS

Kodama et al. ("COMS-VR: Mobile virtual reality entertainment system using electric car and head-mounted display," 2017 IEEE Symposium on 3D User Interfaces (3DUI), Los Angeles, CA, USA, 2017, pp. 130-133, doi: 10.1109/3DUI.2017.7893329.) (Year: 2017).*
Notification of Transmittal of Translation of the International Preliminary Report on Patentability dated Mar. 25, 2021, in International Patent Application No. PCT/EP2019/063019 (7 pages).
International Search Report (Forms PCT/ISA/210, PCT/ISA/220, and PCT/ISA/237), dated Aug. 30, 2019, in International Patent Application No. PCT/EP2019/063019 (16 pages including machine translation).
Notification of the International Preliminary Report on Patentability (Form PCT/IPEA/409, Form PCT/IPEA/416), dated Mar. 2, 2020, in International Patent Application No. PCT/EP2019/063019, including Transmittal Letter and Amended Claims (30 pages including machine translation).
Examination Report dated Feb. 25, 2023 in corresponding German Patent Application No. 10 2018 216 383.9 (5 pages).
Chinese Office Action issued in counterpart Chinese Application No. 201980064333.1 dated Dec. 19, 2023.

* cited by examiner

METHOD AND CONTROL DEVICE FOR OPERATING A HEAD-MOUNTED DISPLAY DEVICE IN A MOTOR VEHICLE

CROSS-REFERENCE TO RELATED APPLICATIONS

This application is a U.S. national stage of International Application No. PCT/EP2019/063019, filed on May 21, 2019. The International Application claims the priority benefit of German Application No. 10 2018 216 383.9 filed on Sep. 25, 2018. Both the International Application and the German Application are incorporated by reference herein in their entirety.

BACKGROUND

Described herein is a method for operating a display device that can be worn on the head in a motor vehicle. Furthermore, also described herein is a control device for operating a display device that can be worn on the head in a motor vehicle as well as a motor vehicle with such a control device.

It is very likely that in the future more and more possibilities will be made available for vehicle occupants to consume virtual experiences while travelling with a motor vehicle. When staging such virtual experiences in motor vehicles, also referred to as in-car VR experiences, it is common to harmonize displayed virtual content to increase immersion and avoid the so-called simulator sickness with a movement of the vehicle in question.

For example, German Patent Application No. 10 2014 220 053 A1 describes a method for operating a display device that can be worn on the head in a motor vehicle, with which the display device is controlled to display a virtual environment within which a vehicle occupant wearing the display device moves virtually in coordination with a detected movement of the motor vehicle.

German Patent Application No. 10 2017 005 982 A1 describes a method for preventing or reducing kinetosis symptoms when using virtual reality glasses while travelling in a vehicle. In addition to a representation of reproduction content, an additional movable mesh structure is shown, wherein a movement of the mesh structure is also carried out in such a way that this corresponds to a current driving dynamic motion state of the vehicle.

German Patent Application No. 10 2014 220 001 A1 describes an autonomous vehicle media control system. This determines whether an event has occurred that justifies a pause or modification of the playback of the media content. This may be the case, for example, when a vehicle is in a traffic situation that requires increased attention from an occupant of the vehicle who is currently consuming the media content. In this case, playback of the media content can be paused.

SUMMARY

One or more aspects of the disclosure provide a solution that allows a particularly immersive and compelling virtual experience by use of a display device worn on the head of a vehicle occupant.

The one or more aspects may be achieved by a method as well as by a control device for operating a display device that can be worn on the head with features described herein. Advantageous embodiments with expedient and non-trivial further developments of the method and control device are also described herein.

With the method described herein for operating a display device that can be worn on the head in a motor vehicle, the display device is controlled to display a virtual environment within which a vehicle occupant wearing the display device moves virtually coordinated with a detected movement of the vehicle. The display device that can be worn on the head can be, for example, virtual reality glasses, augmented reality glasses or augmented reality contact lenses. Data characterizing the movement of the motor vehicle can be provided, for example, by the motor vehicle itself and transmitted at least indirectly to the display device, so that the virtual movement can be carried out in accordance with the real movement of the motor vehicle. If the motor vehicle accelerates or brakes, the vehicle occupant wearing the display device will be accelerated virtually within the displayed virtual environment. This can apply to both longitudinal and lateral accelerations as well as to accelerations in the vertical direction. In the same way, rotational movements and accelerations, such as yaw accelerations or yaw movements of the motor vehicle can be implemented in the virtual environment.

The method described herein includes at least one potential stopping point of the motor vehicle is determined. Once a deceleration of the motor vehicle is detected within a predetermined environment of the determined potential stopping point, the display device is controlled to output a virtual scene staging within the virtual environment, wherein the virtual scene staging causes a deceleration of the virtual movement within the virtual environment corresponding to the deceleration of the motor vehicle.

One or more aspects of the disclosure are based on the realization that in the scene staging of passive and/or interactive virtual experiences, so-called in-car VR experiences, the contents of which are harmonized with the movement of the vehicle to increase the immersion and avoid simulator sickness, there are particular challenges in terms of compelling storytelling due to stops of the vehicle in question which are unpredictable or only predictable with difficulty. In other words, it is difficult, or not possible, to predict in advance when, where, and for how long the motor vehicle in question will stop along a given route. This makes it difficult to create a consistent and credible, i.e. compelling, virtual experience.

Precisely this realization and problem are addressed by the method and control device described herein, in that at least one potential, i.e. possible in the future, stopping point of the motor vehicle is determined and once a deceleration of the motor vehicle is detected within a predetermined environment of the determined potential stopping point, the display device worn on the head of the vehicle occupant is controlled in such a way that a virtual scene staging takes place within the previously reproduced virtual environment, which causes a deceleration of the virtual movement within the virtual environment corresponding to the deceleration of the motor vehicle.

This virtual scene staging is thus integrated into the virtual experience, i.e. within the displayed virtual environment, before a determined potential stopping point. If, for example, the motor vehicle actually decelerates the movement before the determined potential stopping point and stops at the stopping point, for example, the virtual scene staging output results in a particularly immersive and compelling virtual experience for the occupant of the vehicle who has put on the display device that can be worn on the head. The at least one potential stopping point of the motor vehicle may be, for example, a traffic light, an intersection, a road junction, a traffic jam, or another vehicle which is stopping. For example, even with sudden and random traffic light stops, it is possible to create a convincing virtual overall experience using the display device worn on the head, i.e. a particularly immersive and compelling virtual experience.

It is therefore provided to link a detection of an imminent stop when approaching a potential stopping point with the reproduction of the virtual experience by use of the display device that can be worn on the head. In order for the virtual experience to feel convincing, something happens within the displayed virtual environment in the form of the virtual scene staging which convincingly explains a stopping process of the vehicle before or at the determined potential stopping point. As a result, stopping the motor vehicle, especially if there is an abrupt stop, does not act as a break in content within the virtual experience, which would otherwise destroy the important immersion in the virtual experience. The virtual representation is adapted in terms of content and visual terms to the previously reproduced virtual experience. For example, if the virtual experience being played is a computer game, the virtual scene staging includes one or more virtual elements that fit seamlessly into the story of the computer game. The virtual experience of the occupant of the vehicle that is wearing the display device on the head is thus particularly immersive and compelling, especially in the case of abrupt stops of the motor vehicle, since a virtual deceleration within the virtual environment resulting from a deceleration of the motor vehicle is convincingly explained by the virtual representation.

An advantageous embodiment described herein provides that the at least one potential stopping point of the motor vehicle is determined by evaluating at least one of the following provided data items: sensor data characterizing an environment of the motor vehicle; digital map data; traffic flow data; Car2Car data; or data characterizing the driving behavior of a driver of the motor vehicle.

Various sensors of the motor vehicle can be used, for example, to capture an environment of the motor vehicle and to provide corresponding sensor data. By evaluating these sensor data, it is possible to predictively identify potential stopping points of the vehicle, for example because a traffic light, an intersection, a road junction, a road, a traffic jam or, for example, another vehicle that is stopping is detected at an early stage. Digital map data can also be used, so that, based on this, for example junctions, stop signs and the like can be detected at an early stage along a route being travelled by the vehicle. In addition, it is also possible to receive and evaluate traffic flow data online in order to identify potential stopping points of the vehicle at an early stage. It is also possible for the motor vehicle to receive relevant data from other motor vehicles via car-to-car communication. For example, a vehicle ahead can send information about its own movement to the vehicle in question, as a result of which the motor vehicle can detect at an early stage that a vehicle ahead is braking or has already stopped. It is also possible to evaluate and analyze data characterizing the driving behavior of a driver of the motor vehicle in the event that the driver is driving the vehicle himself. For example, it is possible to estimate, based on the driver's immediate driving behavior, whether, when, and where a potential stopping point of the motor vehicle is to be expected. The above data can of course also be used in a wide variety of combinations to determine one or more potential stopping points of the motor vehicle particularly reliably.

Another advantageous embodiment described herein provides that the virtual scene staging is output only if the deceleration of the motor vehicle reaches at least a predetermined deceleration level. For example, it can be ensured that in the event of particularly abrupt decelerations, the virtual scene staging is displayed in any case in order to enable a very compelling virtual experience. If, on the other hand, if the motor vehicle is decelerated very gently in reality before the potential stopping point, it may be provided that the virtual scene staging is omitted, as this is not absolutely necessary for a compelling virtual experience.

According to a further advantageous embodiment described herein, it is provided that once the motor vehicle accelerates with at least a predetermined acceleration after the deceleration, the virtual scene staging ends and the virtual movement takes place according to the movement of the motor vehicle. In other words, if defined start-up dynamics are achieved by the motor vehicle after the deceleration, it may be planned to end the virtual scene staging again. By ending the virtual scene staging, a particularly convincing virtual experience is created within the virtual environment for the occupant of the vehicle, which explains the onward journey and acceleration of the vehicle and thus the real perceived acceleration of the occupant of the vehicle.

In a further advantageous embodiment described herein it is provided that if there is no deceleration of the motor vehicle when passing the stopping point, the virtual scene staging is also omitted. For example, if the motor vehicle is moving towards a traffic light, which has previously been identified as a potential stopping point of the motor vehicle, and this traffic light switches back from red to green in time, for example, so that the motor vehicle can pass through the traffic lights without deceleration, the virtual scene staging which would otherwise have explained the real virtual environment of the vehicle within the virtual experience is not carried out.

Another advantageous embodiment described herein provides that the virtual environment includes a space scene, through which the vehicle occupant wearing the display device flies virtually with a spaceship, wherein a defect occurs on the spaceship as the virtual scene staging, which is repaired as long as the vehicle is at the potential stopping point. The real dynamic change and the virtual dynamic change due to the deceleration of the motor vehicle at the stopping point can thus be explained convincingly within the virtual environment for the occupant that has put on the display device. As soon as the motor vehicle continues after stopping at the relevant stopping point, the virtual repair of the previously staged defect on the spacecraft is completed and the spacecraft can also move within the virtual environment according to the movement of the vehicle. In this context, it is also conceivable that, for example, a warning light is already displayed in the cockpit of the spacecraft when approaching the potential stopping point, which signals the potential defect on the spacecraft. If the motor vehicle actually comes to a standstill, then the defect on the spaceship actually occurs in the context of the scene staging, which is then repaired as long as the motor vehicle is at the stopping point. This results in a particularly convincing explanation within the virtual experience since the effect does not occur suddenly on the spacecraft. If, on the other hand, the vehicle does not stop at the potential stopping point, the warning light in question may, for example, extinguish without the defect on the spacecraft occurring within the virtual environment.

An alternative advantageous embodiment described herein provides that at least one virtual element appears within the virtual environment from a predetermined approach of the motor vehicle to the predetermined environment of the determined potential stopping point, which is designed as part of the scene staging to cause the deceleration of the virtual movement within the virtual environment corresponding to the deceleration of the motor vehicle. This virtual element can be any virtual element that makes it appear convincing when the virtual scene staging occurs. This can also be the warning light mentioned above.

Another advantageous embodiment described herein provides that if there is no deceleration of the motor vehicle when passing the stopping point, the virtual element which appeared previously disappears after passing the stopping point. This results in a particularly realistic virtual experience for the vehicle occupant wearing the display device, since the virtual element which appeared previously, which would otherwise have contributed to a convincing explanation of the deceleration within the virtual environment if it had stopped, is hidden or disappears.

In a further advantageous embodiment described herein, it is provided that the virtual environment includes a space scene, through which the vehicle occupant wearing the display device is flying virtually with a first spaceship, wherein a second spaceship appears as the at least one virtual element and as the virtual scene staging the first spaceship is decelerated according to the deceleration of the motor vehicle by use of a tractor beam of the second spaceship. Should the motor vehicle actually stop at the potential stopping point, the virtual movement with the first spacecraft will be decelerated by the tractor beam in accordance with the deceleration of the motor vehicle. This allows, for example, a traffic light stop of the motor vehicle to be explained convincingly. For example, if the motor vehicle does not stop at the traffic light because it turns green in time, it may be provided that the second spacecraft only flies parallel to the first spaceship and does not actuate the tractor beam at all.

The control device described herein is designed to control a display device that can be worn on the head to carry out the method described herein or an advantageous embodiment of the method described herein. Advantageous embodiments of the method described herein are to be regarded as advantageous embodiments of the control device described herein and vice versa, wherein the control device includes features for carrying out the operations of the method.

The motor vehicle described herein includes the control device described herein or an advantageous embodiment of the control device described herein. Alternatively, it is also possible that the display device that can be worn on the head itself includes the control device. In this case, the control device may have a wide variety of data interfaces by means of which sensor data of the motor vehicle, digital map data, traffic flow data, Car2Car data, and data characteristic of a driving behavior of the driver of the motor vehicle can be received.

Further advantages, features and details arise from the following description of example embodiments as well as on the basis of the drawings. The features and combinations of features mentioned above in the description as well as the features and combinations of features revealed in the description of drawings below and/or shown in the drawings alone may be used not only in the respective specified combination, but also in other combinations or on their own, without departing from the scope of the disclosure.

BRIEF DESCRIPTION OF THE DRAWINGS

These and other aspects and advantages will become more apparent and more readily appreciated from the following description of example embodiments, taken in conjunction with the accompanying drawings, of which.

DETAILED DESCRIPTION

Figure 1:
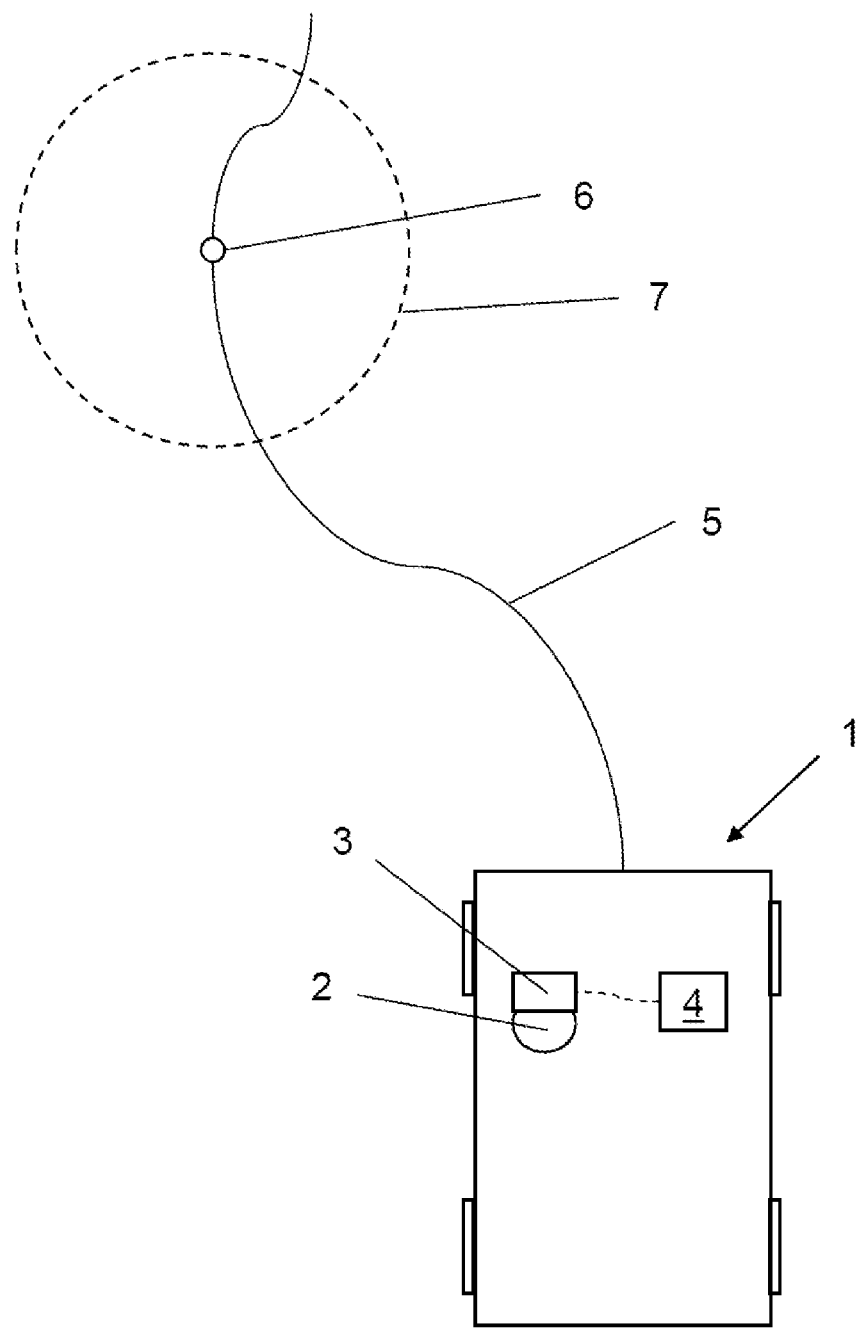
FIG. 1 is a schematic representation of a motor vehicle in which an occupant of the vehicle is sitting and is wearing virtual reality glasses, wherein the motor vehicle is approaching a potential stopping point.

Reference will now be made in detail to examples which are illustrated in the accompanying drawings. In the drawings, elements having the same function are each denoted by the same reference symbols.

A motor vehicle 1, in which a vehicle occupant 2 is siting while wearing virtual reality glasses 3, is shown in a schematic representation in FIG. 1. In addition, a control device 4 is shown schematically, which is set up to control the virtual reality glasses 3. For example, the motor vehicle 1 can be an autonomous motor vehicle 1, so that the occupant 2 can easily consume virtual content by use of the virtual reality glasses 3 without awareness of the driving task. It may also be a non-autonomous motor vehicle 1, wherein a driver that is not shown here drives the motor vehicle 1 and the occupant 2 is only a passenger or co-driver. The motor vehicle 1 travels a certain route 5, along which various potential stopping points 6 may be located. These potential stopping points 6 may be, for example, traffic lights, intersections, road junctions, a traffic jam, or even other vehicles which are stopping. In addition, an environment 7 of the only potential stopping point 6 shown here is marked schematically, wherein this environment 7 is discussed in more detail later.

Figure 2:
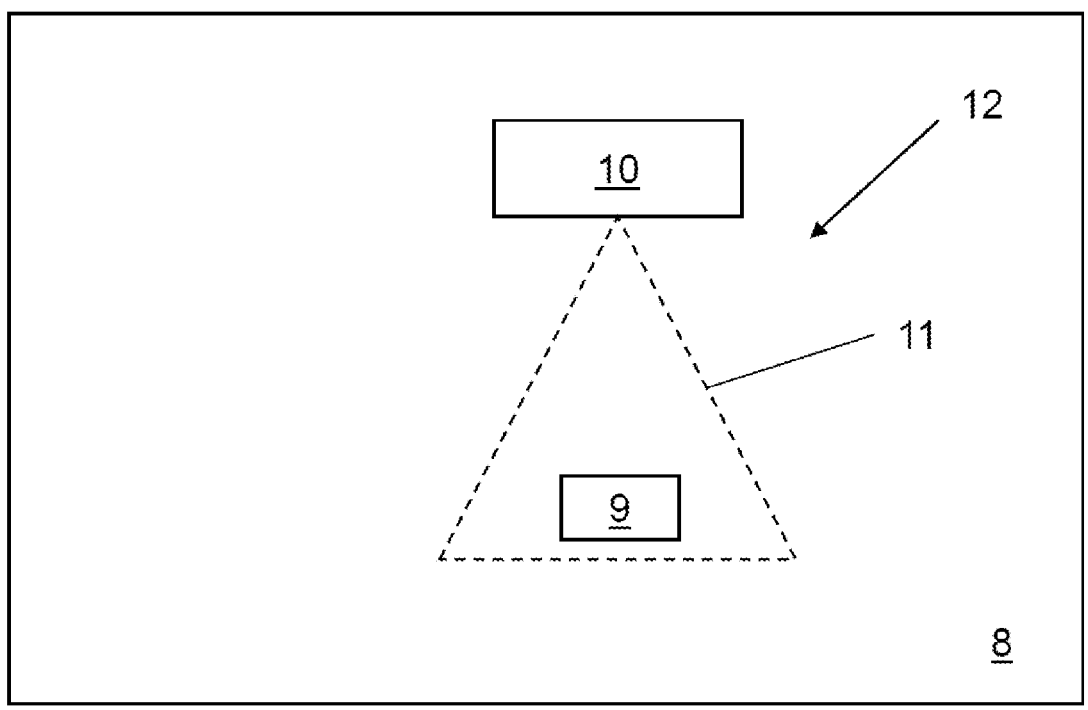
FIG. 2 is a schematic representation of a virtual environment displayed by the virtual reality glasses.

In FIG. 2, a virtual environment 8 is shown in a very schematic manner, which is displayed by use of the virtual reality glasses 3. While travelling with the motor vehicle 1, the control device 4 controls the virtual reality glasses 3 to display the virtual environment 8, within which the vehicle occupant 2 wearing the virtual reality glasses 3 is moving virtually corresponding to a detected movement of the motor vehicle 1. In the present schematically indicated case, the virtual environment 8 includes a space scene, through which the vehicle occupant 2 wearing the virtual reality glasses 3 is flying virtually with a first spaceship 9. The present representation does not correspond to the virtual perspective of the occupant of the vehicle 2.

In the present representation, a second spaceship 10 is flying above the first spaceship 9, which decelerates or stops the first spaceship 9 with a tractor beam 11. The second spaceship 10, together with the tractor beam 11, forms a virtual scene staging 12, which causes a deceleration in the virtual movement within the virtual environment 8. This is used to make the resulting virtual deceleration within the virtual environment 8 appear convincing in the case of an actual deceleration process or stopping process at the potential stopping point 6 (see FIG. 1).

A method for operating the virtual reality glasses 3 is explained in more detail below. While travelling with the motor vehicle 1, the control device 4 continuously receives data which characterize the movement of the motor vehicle 1. Depending on these data characterizing the movement of the motor vehicle, the control device 4 controls the virtual reality glasses 3 to display the virtual environment 8, within which the occupant 2 is moving with the first spaceship 9 according to the detected real movement of the motor vehicle 1. While travelling along the route 5, the control device 4 continuously determines potential stopping points 6 of the motor vehicle, which may be traffic lights, intersections, road junctions, traffic jams or other vehicles which are stopping.

For example, the control device 4 may receive sensor data characterizing an environment of the motor vehicle 1 from the motor vehicle 1. Based on these sensor data, the control device 4 can predictively detect potential stopping points 6 in the direction of travel. It is also possible for the control device 4 to receive digital map data, so that potential stopping points 6 can be determined based on these data. For example, the control device 4 can also receive traffic flow data from a server which is not shown here or the like in order to detect potential stopping points 6 along the route 5 at an early stage. It is also possible that the control device 4 will receive car-to-car data from other vehicles which are not shown here, for example vehicles ahead, in order to identify a deceleration of or stopping by vehicles ahead and thus potential stopping points 6. If the motor vehicle 1 is being driven manually by a driver that is not shown here, it is also possible that the control device 4 receives data characterizing a driving behavior of the driver in order to determine the potential stopping points 6 based on this.

Once a deceleration of the motor vehicle 1 is detected within the predetermined environment 7 of the respective determined potential stopping point 6, the control device 4 controls the virtual reality glasses 3 to output the virtual scene staging 12 within the virtual environment 8. Specifically, in the example described in FIG. 2, for example, from a determined approach of the vehicle 1 to the environment 7, the second spaceship 10 appears in the virtual field of view of the occupant 2 of the vehicle 1. If the motor vehicle 1 actually decelerates within the environment 7 when approaching the potential stopping point 6, the control device 4 controls the virtual reality glasses 3 in such a way that in the course of the virtual scene staging 12 the tractor beam 11 is activated within the virtual environment 8 and consequently the virtual movement is decelerated by the tractor beam 11 decelerating the movement of the first spaceship 9 according to the real deceleration of the motor vehicle 1.

If for example the motor vehicle 1 starts again after a stopping maneuver at the potential stopping point 6, the virtual scene staging 12 is terminated at least to the extent that the tractor beam 11 is terminated and allows the virtual movement of the first spaceship 9 within the virtual environment 8 according to the real movement of the motor vehicle 1. If, on the other hand, the case arises that the motor vehicle 1 approaches the potential stopping point 6 but does not stop there and passes the potential stopping point 6 without deceleration for example, the tractor beam 11 is not activated in the virtual environment 8 in the first place. Subsequently, it may be provided, for example, that the second spaceship 10 which appeared previously disappears from the virtual field of view again and thus from the virtual environment 8 after a certain phase of flight parallel to the first spaceship 9.

Contrary to the representation in FIG. 2, it is also possible, for example, that the occupant 2 of the vehicle is flying within the virtual environment 8 again within a space scene with a spaceship, wherein however, as the virtual scene staging a defect occurs on the spaceship, which is repaired as long as the vehicle 1 is stationary at the potential stopping point 6. This also allows the occupant 2 of the vehicle, who has put on the virtual reality glasses 3, to be given a particularly convincing explanation within the virtual experience of why he stops within the virtual environment 8.

In this context, it may also be provided, for example, that a warning light lights up within a cockpit of the spacecraft indicating a potential defect of the spacecraft if there has been a sufficient approach to the potential stopping point 6, for example on entering the environment 7 of the potential stopping point 6. For example, the warning light can first light up green in the cockpit of the spacecraft, wherein this lamp then turns to orange as soon as the motor vehicle 1 enters the environment 7. If the motor vehicle 1 then actually decelerates in order to stop at the potential stopping point 6, this lamp may, for example, turn red and the defect may occur in the form of the virtual scene staging, which is repaired as long as the motor vehicle 1 is at the potential stopping point 6. If, on the other hand, the vehicle simply passes the potential stopping point 6, the lamp previously illuminated orange can turn green again, which makes a trouble-free movement with the spacecraft within the virtual environment 8 appear convincing.

The example embodiments described in connection with the space scenes or spaceships are to be understood as examples. In principle, a wide variety of virtual scene stagings in the form of different virtual sequences can be displayed by use of the virtual reality glasses 3 in order to correspond to an actual deceleration and stop of the motor vehicle 1 at potential stopping points 6 and thus also a virtual deceleration and stop within the displayed virtual environment 8 to appear convincing. Instead of virtual reality glasses 3, other display devices that can be worn on the head, such as augmented reality glasses or augmented reality contact lenses, can also be used. Overall, the method explained and the control device 4 explained also provide a solution which enables a particularly immersive and compelling virtual experience by use of a display device worn on the head of a vehicle occupant 2.

A description has been provided with reference to various examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for operating a display device wearable by a vehicle occupant of a motor vehicle, the method comprising:
 controlling the display device to display a virtual environment within which the vehicle occupant wearing the display device virtually moves in a virtual vehicle according to a detected movement of the motor vehicle;
 determining a potential stopping point of the motor vehicle within an environment corresponding to the potential stopping point; and
 in response to detection of a deceleration of the motor vehicle within the environment corresponding to the potential stopping point, controlling the display device to output a virtual scene staging including a virtual element displayed with the virtual vehicle within the virtual environment, the virtual scene staging is to represent a deceleration of the virtual movement of the virtual vehicle by the virtual element within the virtual environment to correspond to the deceleration of the motor vehicle, wherein the virtual element is a tractor beam.

2. The method according to claim 1, wherein the potential stopping point of the motor vehicle includes at least one of a traffic light, an intersection, a read junction, a traffic jam, or a location based on a braking of another motor vehicle.

3. The method according to claim 1, determining the potential stopping point of the motor vehicle is based on evaluating at least one of sensor data characterizing an environment of the motor vehicle, digital map data, traffic flow data, car-to-car communication data, or data characterizing a driving behavior of a driver of the motor vehicle.

4. The method according to claim 1, wherein controlling the display device to output the virtual scene staging within the virtual environment is performed in response to the deceleration of the motor vehicle exceeding a predetermined deceleration level.

5. The method according to claim 1, wherein in response to an acceleration of the motor vehicle exceeding an acceleration after the deceleration of the motor vehicle, controlling the display device to end the output of the virtual scene staging, and controlling the display device to display the virtual environment within which the vehicle occupant virtually moves according to the detected movement of the motor vehicle.

6. The method according to claim 1, wherein
in response to no deceleration of the motor vehicle being detected when the motor vehicle passes the potential stopping point, the display device is controlled to not output the virtual scene staging.

7. The method according to claim 1, wherein
the virtual environment includes a space scene through which the vehicle occupant wearing the display device flies virtually with a spaceship as a virtual vehicle occupant, and
the virtual scene staging includes the spaceship having a defect, and repairing the defect while the motor vehicle is stationary at the potential stopping point.

8. The method according to claim 1, wherein,
the tractor beam is displayed within the virtual environment in response to an approach of the motor vehicle to the environment of the potential stopping point.

9. The method according to claim 1, wherein
in response to no deceleration of the motor vehicle being detected when the motor vehicle passes the potential stopping point, ending displaying of the virtual element within the virtual environment after the motor vehicle passes the potential stopping point.

10. The method according to claim 1, wherein
the virtual environment includes a space scene through which the vehicle occupant wearing the display device flies virtually with a first spaceship,
the virtual element includes a second spaceship, and
the virtual scene staging includes decelerating the first spaceship according to the deceleration of the motor vehicle by use of a tractor beam of the second spaceship.

11. A control device, comprising:
a memory configured to store instructions; and
a processor configured to execute the instructions stored in the memory to:
control a display device being worn on a head of a vehicle occupant of a motor vehicle to display a virtual environment within which the vehicle occupant wearing the display device virtually moves in a virtual vehicle according to a detected movement of the motor vehicle,
determine a potential stopping point of the motor vehicle within an environment corresponding to the potential stopping point, and
in response to detection of a deceleration of the motor vehicle within the environment corresponding to the potential stopping point, control the display device to output a virtual scene staging including a virtual element displayed with the virtual vehicle within the virtual environment, the virtual scene staging is to represent a deceleration of the virtual movement of the virtual vehicle by the virtual element within the virtual environment to correspond to the deceleration of the motor vehicle,
wherein the virtual element is a tractor beam.

12. The control device according to claim 11, wherein the potential stopping point of the motor vehicle includes at least one of a traffic light, an intersection, a read junction, a traffic jam, or a location based on a braking of another motor vehicle.

13. The control device according to claim 11, further comprising a data interface configured to receive information including at least one of sensor data characterizing an environment of the motor vehicle, digital map data, traffic flow data, car-to-car communication data, or data characterizing a driving behavior of a driver of the motor vehicle,
wherein the processor is configured to determine the potential stopping point of the motor vehicle based on the information received via the data interface.

14. The control device according to claim 11, wherein the processor is configured to execute the instructions stored in the memory to:
control the display device to output the virtual scene staging within the virtual environment in response to the deceleration of the motor vehicle exceeding a predetermined deceleration level,
in response to an acceleration of the motor vehicle exceeding an acceleration after the deceleration of the motor vehicle, control the display device to end the output of the virtual scene staging, and control the display device to display the virtual environment within which the vehicle occupant virtually moves according to the detected movement of the motor vehicle, and
in response to no deceleration of the motor vehicle being detected when the motor vehicle passes the potential stopping point, control the display device to not output the virtual scene staging.

15. The control device according to claim 11, wherein
the virtual environment includes a virtual scene having a virtual object with which the vehicle occupant wearing the display device virtually interacts, and
in response to the deceleration of the motor vehicle being detected within the environment corresponding to the potential stopping point, the virtual object causes the virtual movement of the vehicle occupant to be decelerated.

16. A motor vehicle, comprising:
a chassis; and
a control device configured to:
control a display device being worn on a head of a vehicle occupant of the motor vehicle to display a virtual environment within which the vehicle occupant wearing the display device virtually moves in a virtual vehicle according to a detected movement of the motor vehicle, determine a potential stopping point of the motor vehicle within an environment corresponding to the potential stopping point, and in response to detection of a deceleration of the motor vehicle within the environment corresponding to the potential stopping point, control the display device to output a virtual scene staging including a virtual element displayed with the virtual vehicle within the virtual environment, the virtual scene staging is to represent a deceleration of the virtual movement of the virtual vehicle by the virtual element within the virtual environment to correspond to the deceleration of the motor vehicle, wherein the virtual element is a tractor beam.

17. The motor vehicle according to claim 16, wherein the potential stopping point of the motor vehicle includes at least one of a traffic light, an intersection, a read junction, a traffic jam, or a location based on a braking of another motor vehicle.

18. The motor vehicle according to claim 16, wherein the control device is configured to determine the potential stopping point of the motor vehicle based on information including at least one of sensor data characterizing an environment of the motor vehicle, digital map data, traffic flow data, car-to-car communication data, or data characterizing a driving behavior of a driver of the motor vehicle.

19. The motor vehicle according to claim 16, wherein the control device is configured to:

control the display device to output the virtual scene staging within the virtual environment in response to the deceleration of the motor vehicle exceeding a predetermined deceleration level, in response to an acceleration of the motor vehicle exceeding an acceleration after the deceleration of the motor vehicle, control the display device to end the output of the virtual scene staging, and control the display device to display the virtual environment within which the vehicle occupant virtually moves according to the detected movement of the motor vehicle, and in response to no deceleration of the motor vehicle being detected when the motor vehicle passes the potential stopping point, control the display device to not output the virtual scene staging.

20. The motor vehicle according to claim 16, wherein the tractor beam is virtually interactable with the virtual vehicle.

* * * * *